United States Patent
Fujimoto et al.

(10) Patent No.: US 12,131,762 B2
(45) Date of Patent: Oct. 29, 2024

(54) MAGNETIC RECORDING MEDIUM, MAGNETIC TAPE CARTRIDGE, AND MAGNETIC RECORDING AND REPRODUCING DEVICE

(71) Applicant: FUJIFILM Corporation, Tokyo (JP)

(72) Inventors: Takashi Fujimoto, Minamiashigara (JP); Eiki Ozawa, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/955,137

(22) Filed: Sep. 28, 2022

(65) Prior Publication Data
US 2023/0100028 A1    Mar. 30, 2023

(30) Foreign Application Priority Data

Sep. 29, 2021 (JP) ................. 2021-158800

(51) Int. Cl.
*G11B 5/706* (2006.01)
*G11B 5/714* (2006.01)
*G11B 5/735* (2006.01)

(52) U.S. Cl.
CPC .......... *G11B 5/70642* (2013.01); *G11B 5/714* (2013.01); *G11B 5/7356* (2019.05)

(58) Field of Classification Search
CPC ......... G11B 5/70678; G11B 5/70; G11B 5/78; G11B 23/107; G11B 5/702; G11B 15/43; G11B 5/735; G11B 5/00813; G11B 5/7356; G11B 5/73929; G11B 5/584; G11B 5/714; G11B 5/73; G11B 15/093; G11B 5/5928; G11B 5/736; G11B 5/73927; G11B 5/00817; G11B 5/73923; G11B 15/32; G11B 5/7013; G11B 5/7021; G11B 5/7023; G11B 5/7028; G11B 5/70605; G11B 5/70615; G11B 5/733; G11B 15/46; G11B 2005/0024; G11B 5/008; G11B 5/012; G11B 5/09; G11B 5/54; G11B 5/55; G11B 5/5508; G11B 5/588; G11B 5/59677; G11B 5/71; G11B 5/712; G11B 5/7358; G11B 5/84; G11B 5/8404; G11B 20/1201; G11B 23/042; G11B 23/08707; G11B 23/08728; G11B 33/14

See application file for complete search history.

(56) References Cited

U.S. PATENT DOCUMENTS

| | | | |
|---|---|---|---|
| 10,622,127 B2 | 4/2020 | Sakane et al. | |
| 11,626,128 B2* | 4/2023 | Terakawa | G11B 5/70678 |
| | | | 360/55 |
| 2006/0177702 A1 | 8/2006 | Ajan | |
| 2020/0118589 A1 | 4/2020 | Terakawa et al. | |
| 2020/0279679 A1 | 9/2020 | Tsujimoto | |
| 2020/0312359 A1* | 10/2020 | Naoi | G11B 5/70642 |
| 2021/0295868 A1 | 9/2021 | Kataguchi et al. | |
| 2023/0108104 A1 | 4/2023 | Ozawa et al. | |

FOREIGN PATENT DOCUMENTS

JP      6010181 B2    10/2016

OTHER PUBLICATIONS

English Machine Translation: Noguchi et al. (JP 08-235570) (Year: 1996).*
English Machine Translation: Aoki (JP H06131649) (Year: 1992).*
Office Action dated Jun. 27, 2023 in U.S. Appl. No. 17/956,243.
Office Action dated Feb. 13, 2024 in U.S. Appl. No. 17/956,243.
Office Action dated May 22, 2024 in U.S. Appl. No. 17/956,243.
Office Action dated Sep. 17, 2024 in U.S. Appl. No. 17/956,243.

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

A magnetic recording medium including a magnetic layer including a ferromagnetic powder. The ferromagnetic powder is an ε-iron oxide powder, and a ratio of Hr (45°) to Hr (0°) (Hr (45°)/Hr (0°)) is 0.50 or less. The Hr (0°) is a residual coercive force Hr obtained by applying a pulse magnetic field having a pulse width of 0.76 ms in an in-plane direction of the magnetic recording medium, and the Hr (45°) is a residual coercive force Hr obtained by setting an angle of the magnetic recording medium in the in-plane direction to 0°, setting an angle of the magnetic recording medium in a perpendicular direction to 90°, and making a pulse magnetic field having a pulse width of 0.76 ms be incident from a direction inclined by 45° toward the perpendicular direction from the in-plane direction and applying the pulse magnetic field to the magnetic recording medium.

19 Claims, No Drawings

MAGNETIC RECORDING MEDIUM, MAGNETIC TAPE CARTRIDGE, AND MAGNETIC RECORDING AND REPRODUCING DEVICE

CROSS-REFERENCE TO RELATED APPLICATIONS

This application claims priority under 35 U.S.C 119 to Japanese Patent Application No. 2021-158800 filed on Sep. 29, 2021. The above application is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

Magnetic recording media have been widely used as recording media for data storage for recording and storing various pieces of data (see, for example, paragraph 0089 and the like of JP6010181B).

SUMMARY OF THE INVENTION

In a magnetic recording medium, a magnetic layer containing a ferromagnetic powder is usually provided on a non-magnetic support. As for the ferromagnetic powder, for example, as disclosed in JP6010181B, ε-iron oxide powder has been attracting attention in recent years.

The recording method for magnetic recording includes an in-plane recording method and a perpendicular recording method, and for a magnetic recording medium such as a magnetic tape, for example, the in-plane recording method is the mainstream as the recording method. Therefore, a magnetic recording medium including a magnetic layer containing ε-iron oxide powder and having excellent in-plane recording suitability is desirable. For example, a magnetic recording medium capable of exhibiting excellent electromagnetic conversion characteristics in a case of reproducing data recorded by the in-plane recording method can be referred to be a magnetic recording medium having excellent in-plane recording suitability.

In view of the above, one aspect of the present invention is to provide a magnetic recording medium including a magnetic layer containing an ε-iron oxide powder and capable of exhibiting electromagnetic conversion characteristics in a case of reproducing data recorded by the in-plane recording method.

According to one aspect of the present invention, there is provided a magnetic recording medium comprising: a non-magnetic support, and a magnetic layer containing a ferromagnetic powder, in which the ferromagnetic powder is an ε-iron oxide powder, and a ratio (Hr (45°)/Hr (0°)) of Hr (45°) to Hr (0°) is 0.50 or less.

The Hr (0°) is a residual coercive force Hr obtained by applying a pulse magnetic field having a pulse width of 0.76 ms in an in-plane direction of the magnetic recording medium, and the Hr (45°) is a residual coercive force Hr obtained by setting an angle of the magnetic recording medium in the in-plane direction to 0°, setting an angle of the magnetic recording medium in a perpendicular direction to 90°, and making a pulse magnetic field having a pulse width of 0.76 ms be incident from a direction inclined by 450 toward the perpendicular direction from the in-plane direction and applying the pulse magnetic field to the magnetic recording medium.

In one embodiment, the ratio (Hr (45°)/Hr (0°)) may be 0.45 or less.

In one embodiment, the ratio (Hr (45°)/Hr (0°)) may be 0.40 or less.

In one embodiment, the ratio (Hr (45°)/Hr (0°)) may be 0.35 or less.

In one embodiment, the ratio (Hr (45°)/Hr (0°)) may be 0.10 to 0.35.

In one embodiment, the ε-iron oxide powder may contain a cobalt element, an element selected from the group consisting of a gallium element and an aluminum element, and a titanium element.

In one embodiment, the magnetic recording medium may further include a non-magnetic layer containing a non-magnetic powder between the non-magnetic support and the magnetic layer.

In one embodiment, the magnetic recording medium may include a back coating layer containing a non-magnetic powder on a surface side of the non-magnetic support opposite to a surface side provided with the magnetic layer.

In one embodiment, the magnetic recording medium may be a magnetic tape.

According to another aspect of the present invention, there is provided a magnetic tape cartridge including the magnetic tape described above.

According to still another aspect of the present invention, there is provided a magnetic recording and reproducing device including the magnetic recording medium described above.

According to one aspect of the present invention, it is possible to provide the magnetic recording medium including the magnetic layer containing the ε-iron oxide powder and capable of exhibiting electromagnetic conversion characteristics in a case of reproducing data recorded by the in-plane recording method. In addition, according to one aspect of the present invention, it is possible to provide a magnetic tape cartridge and a magnetic recording and reproducing device including the magnetic recording medium.

DESCRIPTION OF THE PREFERRED EMBODIMENTS

Magnetic Tape

An aspect of the present invention relates to a magnetic recording medium including a non-magnetic support, and a magnetic layer containing a ferromagnetic powder. The ferromagnetic powder is an ε-iron oxide powder, and in the magnetic recording medium, a ratio of Hr (45°) to Hr (0°) (Hr (45°)/Hr (0°)) is 0.50 or less. In the present invention and the present specification, the Hr (0°) is a residual coercive force Hr obtained by applying a pulse magnetic field having a pulse width of 0.76 ms in an in-plane direction of the magnetic recording medium. The Hr (45°) is a residual coercive force Hr obtained by setting an angle of the magnetic recording medium in the in-plane direction to 0°, setting an angle of the magnetic recording medium in a perpendicular direction to 90°, and making a pulse magnetic field having a pulse width of 0.76 ms be incident from a direction inclined by 450 toward the perpendicular direction (opposite direction to a saturation magnetization direction which will be described later) from the in-plane direction and applying the pulse magnetic field to the magnetic recording medium. The unit "ms" represents millisecond. In addition, in the present invention and the present specification, the "in-plane direction of the magnetic recording medium" is a longitudinal direction for a tape-shaped magnetic recording medium, that is, a magnetic tape, and is a radial direction for a disk-shaped magnetic recording medium, that is, a magnetic disk. The "perpendicular direction of the magnetic recording medium" is a direction orthogonal to the in-plane direction of the magnetic recording medium in a thickness direction of the magnetic recording medium. The "surface of the magnetic layer" is identical to the surface of the magnetic recording medium on the magnetic layer side.

The Hr (0°) and the Hr (45°) are obtained by the following methods.

Two sample pieces are cut out from the magnetic recording medium to be measured, one is used for measurement of the Hr (0°) and the other one is used for measurement of the Hr (45°). A size of the sample piece may be any size that can be introduced into a vibrating sample magnetometer used for the measurement. The in-plane direction and the perpendicular direction of the sample piece below refer to the in-plane direction and the perpendicular direction in a state where the sample piece is included in the magnetic recording medium. The following pulse magnetic field is a single pulse magnetic field. In addition, the following measurement of a residual magnetization amount is performed at a measurement temperature of 23° C. The measurement temperature is a temperature of the sample piece. By setting the atmosphere temperature around the sample piece to the measurement temperature (23° C.), the temperature of the sample piece can be set to the measurement temperature by realizing temperature equilibrium.

For the sample piece for Hr (0°) measurement, Hr (0°) is measured by the following method.

(1) First, using a pulse magnetic field generator, a DC magnetic field of 40 kOe is applied in the perpendicular direction of the sample piece for 10 seconds to perform saturation magnetization of the ferromagnetic powder contained in the magnetic layer of the sample piece, and then the applied magnetic field is removed. Here, the DC magnetic field applied in the perpendicular direction may be incident from a surface side of the magnetic layer of the sample piece, or may be incident from the other surface side. Regarding the unit, 1 [kOe]=($10^6$/4π) [A/m]. As the pulse magnetic field generator, for example, MPM-04 manufactured by Toei Kogyo Co., Ltd. can be used, and in the examples which will be described later, MPM-04 manufactured by Toei Kogyo Co., Ltd. was used. The same also applies to the measurement of the Hr (45°).

(2) Within 20 seconds from the saturation magnetization described above, the pulse magnetic field having the pulse width of 0.76 ms is applied to the sample piece with a magnetic field strength in the in-plane direction (it does not matter whether it is from either the front or the back, as long as it is the in-plane direction) using the same pulse magnetic field generator.

(3) Within 20 seconds from the end of application of the pulse magnetic field, a residual magnetization amount of the sample piece is measured using a vibrating sample magnetometer. As the vibrating sample magnetometer, for example, P2SH manufactured by Toei Kogyo Co., Ltd. can be used, and in the examples which will be described later, P2SH manufactured by Toei Kogyo Co., Ltd. was used. The same also applies to the measurement of the Hr (45°).

(4) The steps (1) to (3) described above are repeated with various pulse magnetic field strengths to obtain a value of the pulse magnetic field in a case where the residual magnetization is 0 $Am^2$/kg, and this is defined as Hr (0°).

For the sample piece for the measurement of the Hr (45°), the Hr (45°) is measured by the following method.

(1) First, using a pulse magnetic field generator, a DC magnetic field of 40 kOe is applied in the perpendicular direction of the sample piece for 10 seconds to perform saturation magnetization of the ferromagnetic powder contained in the magnetic layer of the sample piece, and then the applied magnetic field is removed. Here, the DC magnetic field applied in the perpendicular direction may be incident from a surface side of the magnetic layer of the sample piece, or may be incident from the other surface side.

(2) Within 20 seconds from the saturation magnetization described above, the pulse magnetic field having the pulse width of 0.76 ms is applied to the sample piece with a random magnetic field strength by making the pulse magnetic field be incident from a direction inclined by 45°, that is, a direction at an angle of 450 toward the perpendicular direction (opposite direction to the saturation magnetization direction) from the in-plane direction (it does not matter whether it is from either the front or the back, as long as it is the direction at the angle of 45°) using the same pulse magnetic field generator, by setting the angle of the sample piece in the in-plane direction to 0° and setting the angle of the sample piece in the perpendicular direction opposite to the saturation magnetization direction to 90°.

(3) Within 20 seconds from the end of application of the pulse magnetic field, a residual magnetization amount of the sample piece is measured using a vibrating sample magnetometer.

(4) The steps (1) to (3) described above are repeated with various pulse magnetic field strengths to obtain a value of the pulse magnetic field in a case where the residual magnetization is 0 $Am^2$/kg, and this is defined as Hr (45°).

From the Hr (45°) and the Hr (0°) obtained by method described above, the ratio (Hr (45°)/Hr (0°)) is obtained by dividing the Hr (45°) by the Hr (0°).

In the magnetic recording medium, the ratio (Hr (45°)/Hr (0°)) obtained as described above is 0.50 or less. Accordingly, the magnetic recording medium can exhibit excellent electromagnetic conversion characteristics in a case of reproducing data recorded by the in-plane recording method. In this regard, the inventors of the present invention surmise as follows. However, the present invention is not limited to the other surmises described in the present specification including the surmise described below.

Data is recorded on the magnetic layer of the magnetic recording medium by applying a magnetic field (hereinafter, also referred to as a "recording magnetic field") from the magnetic head to invert the magnetization of particles of the ferromagnetic powder in the magnetic layer. In a case of applying the recording magnetic field from the magnetic head, by making the recording magnetic field be incident from the direction inclined with respect to the in-plane direction (oblique direction) to the magnetic layer, the recording magnetic field incidence to the magnetic layer follows a path parallel to the in-plane direction in the magnetic layer, is emitted in the oblique direction from the magnetic layer, and collected in a recording head. The recording method for controlling the direction of the recording magnetic field to be applied to the recording layer for the magnetization inversion to be parallel to the in-plane direction as described above is the in-plane recording method. The in-plane recording method is also generally referred to as a horizontal recording method, a longitudinal recording method, or the like. In addition, the recording method for controlling the direction of the recording magnetic field to be applied to the magnetic layer for the magnetization inversion to be perpendicular to the surface of the magnetic layer is the perpendicular recording method. Here, regarding the direction of the recording magnetic field, the "perpendicular" in the present invention and the present specification does not mean only a perpendicular direction in the strict sense, but also includes a range of errors allowed in the technical field of the present invention. For example, the range of errors means a range of less than ±10° from an exact perpendicular direction. The same also applies for "horizontal".

In the magnetic recording of the in-plane recording method, the recording magnetic field is incident to the magnetic layer from the oblique direction as described above. During the studies regarding the in-plane recording suitability of the magnetic recording medium including the magnetic layer containing the ε-iron oxide powder, the inventors of the present invention considered that, in the magnetic recording medium including the magnetic layer containing the ε-iron oxide powder, making the magnetization inversion of the particles of the ε-iron oxide powder easily occur with respect to the magnetic field incident to the magnetic layer from the oblique direction can contribute to improvement of the electromagnetic conversion characteristics in a case of reproducing data recorded by the in-plane recording method. In addition, in the studies conducted even more, the inventors of the present invention considered that the ratio (Hr (45°)/Hr (0°)) can be an indicator of ease of occurrence of the magnetization inversion, and repeated intensive studies. As a result, the inventors of the present invention newly found that, in the magnetic recording medium including the magnetic layer containing the ε-iron oxide powder, the magnetic recording medium having the ratio (Hr (45°)/Hr (0°)) of 0.50 or less can exhibit excellent electromagnetic conversion characteristics, specifically, a high signal-to-noise ratio (SNR), in a case of reproducing data recorded by the in-plane recording method. In addition, in a case of obtaining the ratio (Hr (45°)/Hr (0°)), the angle 45° was used as an example of an incidence angle of the recording magnetic field incident to the magnetic layer from the oblique direction, and the incidence angle of the recording magnetic field applied in order to record data on the magnetic layer of the magnetic recording medium is not limited to 45°. In addition, the pulse width is merely set to 0.76 ms in consideration of general recording conditions of the magnetic recording in recent years, and therefore the recording conditions during the recording of the data on the magnetic layer of the magnetic recording medium are not particularly limited.

Hereinafter, the magnetic recording medium will be further described in detail.

Ratio (Hr (45°)/Hr (0°))

In the magnetic recording medium, the ratio (Hr (45°)/Hr (0°)) is 0.50 or less from a viewpoint of improving the electromagnetic conversion characteristics in a case of reproducing the data recorded by the in-plane recording method. The inventors of the present invention consider that, as the value of the ratio (Hr (45°)/Hr (0°)) is small, the particles of the ε-iron oxide powder easily performs the magnetization inversion with respect to the magnetic field incident to the magnetic layer from the oblique direction. From a viewpoint of further improving the electromagnetic conversion characteristics, the ratio (Hr (45°)/Hr (0°)) is preferably 0.48 or less, more preferably 0.45 or less, even more preferably 0.43 or less, still preferably 0.40 or less, still more preferably 0.38 or less, and still even more preferably 0.35 or less. The ratio (Hr (45°)/Hr (0°)) can be, for example, 0.10 or more, 0.20 or more, or can be less than the value exemplified here. A method of controlling the ratio (Hr (45°)/Hr (0°)) will be described later.

The Hr (45°) and the Hr (0°) are not particularly limited, as long as the ratio (Hr (45°)/Hr (0°)) is 0.50 or less. In one embodiment, the Hr (45°) can be, for example, 3000 Oe or more or 3500 Oe or more, and can be, for example, 8000 Oe or less or 7000 Oe or less. In addition, in one embodiment, the Hr (0°) can be, for example, 8000 Oe or more or 10000 Oe or more, and can be, for example, 20000 Oe or less or 15000 Oe or less.

Magnetic Layer

ε-Iron Oxide Powder

The magnetic recording medium contains an ε-iron oxide powder as a ferromagnetic powder in the magnetic layer. In the present invention and the present specification, the "ε-iron oxide powder" is a ferromagnetic powder in which an ε-iron oxide type crystal structure (ε phase) is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure (ε phase), it is determined that the ε-iron oxide type crystal structure is detected as a main phase. In addition to the ε phase of the main phase, an α phase and/or a γ phase may or may not be contained. The ε-iron oxide powder in the present invention and the present specification includes a so-called unsubstitution type ε-iron oxide powder composed of iron and oxygen, and a so-called substitution type ε-iron oxide powder containing one or more kinds of substitutional elements to be substituted with iron.

Method for Producing ε-Iron Oxide Powder As a producing method of the ε-iron oxide powder, a producing method from a goethite, and a reverse micelle method are known. All of the producing methods is well known. In addition, for a method of producing the ε-iron oxide powder in which a part of iron is substituted with a substitutional element, a description disclosed in J. Jpn. Soc. Powder Metallurgy Vol. 61 Supplement, No. S1, pp. S280-S284, J. Mater. Chem. C, 2013, 1, pp. 5200-5206 can be referred to, for example.

As an example, for example, the ε-iron oxide powder contained in the magnetic layer of the magnetic recording medium can be obtained by a producing method for obtaining an ε-iron oxide powder through preparing a precursor of an ε-iron oxide (hereinafter, also referred to as a "precursor preparation step"), subjecting the precursor into a coating film forming process (hereinafter, also referred to as a "coating film forming step"), heating the precursor after the coating film forming process to convert the precursor into an ε-iron oxide (hereinafter, also referred to as a "heat treatment step"), and performing a coating film removing process of the ε-iron oxide (hereinafter, also referred to as a "coating film removing step").

Hereinafter, the producing method will be further described below. However, the producing method described below is an example, and the ε-iron oxide powder described above is not limited to an ε-iron oxide powder produced by the producing method exemplified below.

Precursor Preparation Step

The precursor of the ε-iron oxide refers to a substance that contains an ε-iron oxide type crystal structure as a main phase by heating. The precursor can be, for example, iron, a hydroxide containing an element capable of substituting a part of iron in a crystal structure, an oxyhydroxide (oxide hydroxide), or the like. The precursor preparation step can be carried out by using a coprecipitation method, a reverse micelle method, or the like. Such a method for preparing such a precursor is well known, and the precursor preparation step in the producing method described above can be performed by a well-known method. For example, regarding the method for preparing the precursor, well-known technologies in paragraphs 0017 to 0021 and examples of JP2008-174405A, paragraphs 0025 to 0046 and examples of WO2016/047559A1, paragraphs 0038 to 0040, 0042, 0044, and 0045 and examples of WO2008/149785A1 can be referred to.

An ε-iron oxide, which does not contain a substitutional element to be substituted with a part of iron (Fe), can be represented by a compositional formula: $Fe_2O_3$. On the other hand, an ε-iron oxide in which a part of iron is substituted with, for example, one or more elements can be represented by a compositional formula: $A^1_x A^2_y A^3_z Fe_{(2-x-y-z)} O_3$. $A^1$, $A^2$, and $A^3$ each independently represent one or more substitutional elements to be substituted with iron, and x, y and z are each independently 0 or more and less than 2, but at least one of them is more than 0, and x+y+z is less than 2. The ε-iron oxide powder may or may not contain a substitutional element to be substituted with iron, and preferably contains. The kind of the substitutional element can be 1 or more, and may be 1 to 3, 1 to 5, or 1 to 6. The magnetic properties of ε-iron oxide powder can be adjusted by the kind and amount of substitutional elements. For example, the value of Hr (0°) can be adjusted by adjusting the magnetic properties of the ε-iron oxide powder as described above. In a case where a substitutional element is included, examples of the substitutional element include one or more of Ga, Al, In, Rh, Mn, Co, Ni, Zn, Ti, and Sn. For example, in the compositional formula described above, $A^1$ can be one or more kinds selected from the group consisting of Ga, Al, In, and Rh, $A^2$ can be one or more kinds of selected from the group consisting of Co, Mn, Ni, and Zn, and $A^3$ can be one or more kinds selected from the group consisting of Ti and Sn. The ε-iron oxide powder preferably contains a cobalt element (Co), more preferably contains the cobalt element, one kind or more selected from the group consisting of a gallium element (Ga), an aluminum element (Al), an indium element (In), and a rhodium element (Rh), and one kind or more selected from the group consisting of a titanium element (Ti) and a tin element (Sn), even more preferably contains the cobalt element, the gallium element and/or the aluminum element, and the titanium element and/or the tin element, and still preferably contains the cobalt element, the gallium element and/or the aluminum element, and the titanium element. In a case of producing an ε-iron oxide powder containing a substitutional element to be substituted with iron, a part of a compound that is a source of iron in the ε-iron oxide may be replaced with a compound of the substitutional element. The composition of the ε-iron oxide powder to be obtained can be controlled by the amount of substitution. Examples of the compound that is a source of iron and various substitutional elements include inorganic salts such as nitrates, sulfates, and chlorides (may be hydrates), organic salts such as pentakis (hydrogen oxalate) salts (may be a hydrate), hydroxide, and oxyhydroxide.

Coating Film Forming Step

In a case where the precursor is heated after the coating film forming process, a reaction of converting the precursor into an ε-iron oxide can proceed under the coating film. It is also considered that the coating film can play a role in preventing sintering from occurring during heating. From a viewpoint of ease of coating film formation, the coating film forming process is preferably performed in a solution, and more preferably performed by adding a coating film forming agent (compound for coating film forming) to the solution containing the precursor. For example, in a case where the coating film forming process is performed in the same solution following the precursor preparation, a coating film forming agent can be added to the solution after the precursor preparation and stirred to form a coating film on the precursor. A silicon-containing coating film can be used as a coating film preferable in a viewpoint that a coating film can be easily formed on the precursor in the solution. As the coating film forming agent for forming the silicon-containing coating film, for example, a silane compound such as alkoxysilane can be used. By hydrolysis of the silane compound, a silicon-containing coating film can be formed on the precursor, preferably by using a sol-gel method. Specific examples of the silane compound include tetraethoxysilane (tetraethyl orthosilicate (TEOS)), tetramethoxysilane, and various silane coupling agents. Regarding the coating film forming process, well-known technologies in paragraphs 0022 and examples of JP2008-174405A, paragraphs 0047 to 0049 and examples of WO2016/047559A1, and paragraphs 0041 and 0043 and examples of WO2008/149785A1 can be referred to. For example, the coating film forming process can be carried out by stirring a solution containing the precursor and the coating film formation agent at a liquid temperature of 50° C. to 90° C. A stirring time can be, for example, 5 to 36 hours. The coating may be coated over the entire surface of the precursor or a part of the surface of the precursor which is not coated with the coating may be included.

Heat Treatment Step

The precursor after the coating film forming process is heated to convert the precursor into an ε-iron oxide. The heat treatment can be performed on, for example, a powder collected from the solution subjected to the coating film forming process (powder of the precursor having the coating film). Regarding the heat treatment step, well-known technologies in paragraph 0023 and examples of JP2008-174405A, paragraph 0050 and examples of WO2016/047559A1, and paragraphs 0041 and 0043 and examples of WO2008/149785A1 can be referred to. The heat treatment step can be performed, for example, in a heating furnace having a furnace inner temperature of 900° C. to 1,200° C. for approximately 3 to 6 hours. As the temperature of the heat treatment step further increases and/or as the heat treatment time further increases, a particle size of the ε-iron oxide powder to be obtained tends to further increase.

Coating Film Removing Step

The heat treatment step can be performed to convert the precursor having a coating film into ε-iron oxide. Since the coating film remains on the ε-iron oxide thus obtained, the coating film removing process is preferably performed. Regarding the coating film removing process, well-known technologies in paragraph 0025 and examples of JP2008-174405A, and paragraph 0053 and examples of WO2008/149785A1 can be referred to. The coating film removing process can be performed, for example, by stirring the ε-iron oxide having the coating film in an aqueous sodium hydroxide solution having a concentration of approximately 1 to 5 mol/L and a liquid temperature of approximately 60° C. to 90° C. for approximately 5 to 36 hours. However, the ε-iron oxide powder contained in the magnetic layer of the magnetic recording medium may be produced without undergoing the coating film removing process, and the coating film may not be completely removed in the coating film removing process and a part of the coating film may remain.

Well-known steps can also be optionally performed before and/or after the various steps described above. Examples of such steps include various well-known steps such as classification, centrifugal separation, filtration, washing, and drying.

Average Particle Size

The average particle size of the ε-iron oxide powder contained in the magnetic layer of the magnetic recording medium is preferably 5.0 nm or more, more preferably 6.0 nm or more, even more preferably 7.0 nm or more, still preferably 8.0 nm or more, and still more preferably 9.0 nm or more, from a viewpoint of magnetization stability. From a viewpoint of high-density recording, the average particle size of the ε-iron oxide powder is preferably 20.0 nm or less, more preferably 19.0 nm or less, even more preferably 18.0 nm or less, still preferably 17.0 nm or less, still more preferably 16.0 nm or less, and still even more preferably 15.0 nm or less. The magnetic recording medium having the magnetic layer containing the ε-iron oxide powder having a small average particle size tends to have a small value of Hr (0°).

In the present invention and the present specification, average particle sizes of various powder such as the ε-iron oxide powder and the like are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic mean of the particle size of 500 particles obtained as described above is an average particle size of the powder.

As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means an aggregate of a plurality of particles. For example, the ferromagnetic powder means an aggregate of a plurality of ferromagnetic particles. The aggregate of a plurality of particles is not limited to an embodiment in which particles configuring the aggregate directly come into contact with each other, but also includes an embodiment in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50% to 90% by mass and more preferably in a range of 60% to 90% by mass with respect to a total mass of the magnetic layer. A high filling percentage of the ferromagnetic powder in the magnetic layer is preferable from a viewpoint of improvement of recording density.

Binding Agent

The magnetic recording medium can be a coating type magnetic recording medium, and can include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, or a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the non-magnetic layer and/or a back coating layer which will be described later.

For the binding agent described above, description disclosed in paragraphs 0028 to 0031 of JP2010-24113A can be referred to. In addition, the binding agent may be a radiation curable resin such as an electron beam curable resin. For the radiation curable resin, paragraphs 0044 and 0045 of JP2011-048878A can be referred to. An average molecular weight of the resin used as the binding agent can be, for example, 10,000 to 200,000 as a weight-average molecular weight. The weight-average molecular weight of the present invention and the present specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. The amount of the binding agent used can be, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one embodiment, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 10.0 to 80.0 parts by mass and more preferably 50.0 to 80.0 parts by mass, from a viewpoint of improvement of hardness of the magnetic layer.

The description regarding the binding agent and the curing agent described above can also be applied to the non-magnetic layer and/or the back coating layer. In this case, the description regarding the content can be applied by replacing the ferromagnetic powder with the non-magnetic powder.

Additives

The magnetic layer may include one or more kinds of additives, as necessary. As the additives, the curing agent described above is used as an example. In addition, examples of the additive included in the magnetic layer include a non-magnetic powder (for example, inorganic powder, carbon black, and the like), a lubricant, a dispersing agent, a dispersing assistant, a fungicide, an antistatic agent, and an antioxidant. In addition, for example, for the lubricant, a description disclosed in paragraphs 0030 to 0033, 0035, and 0036 of JP2016-126817A can be referred to. The non-magnetic layer which will be described later may include the lubricant. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which may be added to the non-magnetic layer forming composition, a description disclosed in a paragraph 0061 of JP2012-133837A can be referred to. As the non-magnetic powder which may be contained in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, commercially available products can be appropriately selected according to desired properties, or the additive can be produced by a well-known method and used in any amount. As an example of the additive which can be used in the magnetic layer including the abrasive for improving dispersibility of the abrasive, a dispersing agent disclosed in paragraphs 0012 to 0022 of JP2013-131285A can be used.

The magnetic layer described above can be provided on the surface of the non-magnetic support directly or indirectly through the non-magnetic layer.

Non-Magnetic Layer

The non-magnetic powder used in the non-magnetic layer may be powder of an inorganic substance or powder of an organic substance. In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black capable of being used in the non-magnetic layer, a description disclosed in paragraphs 0040 and 0041 of JP2010-24113A can be referred to. The content (filling percentage) of the non-magnetic powder of the non-magnetic layer is preferably in a range of 50% to 90% by mass and more preferably in a range of 60% to 90% by mass with respect to a total mass of the non-magnetic layer.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the present invention and the present specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide such as aromatic polyamide, polyamide imide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

In one embodiment, the magnetic recording medium can include a back coating layer containing a non-magnetic powder on a surface side of the non-magnetic support opposite to a surface side provided with the magnetic layer, and in another aspect, the magnetic recording medium may not include the back coating layer. The back coating layer preferably includes any one or both of carbon black and inorganic powder. The back coating layer can include a binding agent and can also include additives. In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

A thickness of the non-magnetic support is preferably 3.0 to 6.0 μm.

A thickness of the magnetic layer is preferably 200 nm or less, more preferably in a range of 8 to 200 nm, and even more preferably in a range of 10 to 200 nm, from a viewpoint of realization of high-density recording required in recent years. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and preferably 0.1 to 1.0 μm.

A thickness of the back coating layer is preferably equal to or smaller than 0.9 μm and more preferably 0.1 to 0.7 μm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a transmission electron microscope or a scanning electron microscope. In the cross section observation, various thicknesses can be obtained as the thickness obtained at one portion, or as an arithmetic mean of thicknesses obtained at a plurality of portions which are two or more portions randomly selected. Alternatively, the thickness of each layer may be obtained as a designed thickness calculated under the manufacturing conditions.

Manufacturing Step

A step of preparing the composition for forming the magnetic layer, the non-magnetic layer, or the back coating layer can generally include at least a kneading step, a dispersing step, and a mixing step provided before and after these steps, as necessary. Each step may be divided into two or more stages. Components used in the preparation of each layer forming composition may be added at the beginning or during any step. As the solvent, one kind or two or more kinds of various kinds of solvents usually used for producing a coating type magnetic recording medium can be used. For the solvent, descriptions disclosed in paragraph 0153 of JP2011-216149A can be referred to, for example. In addition, each component may be separately added in two or more steps. In order to manufacture the above magnetic recording medium, a well-known manufacturing technology of the related art can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-79274A (JP-H01-79274A) can be referred to. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

After the coating step, various processes such as a drying process, an orientation process of a magnetic layer, and a surface smoothing process (calender process) can be performed. For details of the various processes, a well-known technology disclosed in paragraphs 0052 to 0057 of JP2010-24113A can be referred to, for example. For example, the coating layer of the magnetic layer forming composition can be subjected to an orientation process, while the coating layer is wet. For the orientation process, various well-known technologies such as descriptions disclosed in a paragraph 0067 of JP2010-231843A can be used. For example, a perpendicular orientation process can be performed by a well-known method such as a method using a different polar opposing magnet. In the orientation zone, a drying speed of the coating layer can be controlled by a temperature, an air flow of the drying air and/or a transportation rate of the non-magnetic support on which the coating layer is formed in the orientation zone. In addition, the coating layer may be preliminarily dried before transporting to the orientation zone.

Regarding the control of the ratio (Hr (45°)/Hr (0°)), the performing of the AC magnetic field application process while the coating layer of the magnetic layer forming composition is wet, after the perpendicular orientation process can be used as an example of the method for controlling the ratio (Hr (45°)/Hr (0°)). It is preferable that the AC magnetic field is applied in a direction that is the in-plane direction of the finally formed magnetic layer with respect to the coating layer of the magnetic layer forming composition. The inventors of the present invention surmise as below about the reason why the ratio (Hr (45°)/Hr (0°)) can be controlled by performing the AC magnetic field application process after the perpendicular orientation process as described above. Regarding the orientation direction described below, the "perpendicular" in the present invention and the present specification does not mean only a perpendicular direction in the strict sense, but also includes a range of errors allowed in the technical field of the present invention. For example, the range of errors means a range of less than ±10° from an exact perpendicular direction. The same also applies for "horizontal".

By performing the perpendicular orientation process, in the coating layer of the magnetic layer forming composition (hereinafter, also simply referred to as a "coating layer"), particles having various sizes constituting the ε-iron oxide powder are orientated in the perpendicular direction to the surface of the coating layer. It is surmised that, after that, in a case where the AC magnetic field is applied in the direction that is the in-plane direction of the finally formed magnetic layer, the particles having a relatively small size among the particles having various sizes of the ε-iron oxide powder contained in the coating layer can be selectively oriented in a parallel direction (direction that is the in-plane direction in the finally formed magnetic layer) to the surface of the coating layer. The reason for this surmise is that, since the particles having a small size are low Hk particles having a low anisotropic magnetic field Hk, the magnetization inversion is easily performed by the application of the AC magnetic field, whereas, since the particles having a large size are high Hk particles having a high anisotropic magnetic field Hk, the magnetization inversion is difficult to be performed. Accordingly, in the magnetic layer formed by drying the coating layer on which the perpendicular orientation process and the AC magnetic field application process are performed, among the particles having various sizes of the ε-iron oxide powder, the high Hk particles mainly relating to the recording of data is in a state of being oriented in the perpendicular direction, and the low Hk particles are in a state of being oriented in the in-plane direction. It is considered that, in a case where the recording magnetic field is applied to the magnetic layer containing the ε-iron oxide powder in such a state in order to record the data by the in-plane recording method, the low Hk particles oriented in the perpendicular direction can play a role of assisting the magnetization inversion of the high Hk particles oriented in the in-plane direction, and as a result, the magnetization inversion of the high Hk particles mainly relating to the recording of the data can easily occur. It is surmised that, the orientation of the low Hk particles in the direction inclined with respect to an incidence direction of the recording magnetic field incident to the magnetic layer from the oblique direction in order to record the data by the in-plane recording method, is the reason why the low Hk particles can assist the magnetization inversion of the high Hk particles. It is considered that, as the magnetization inversion of the high Hk particles is more strongly assisted by the low Hk particles, the value of ratio (Hr (45°)/Hr (0°)) decreases. For example, the higher the magnetic field strength of the applied AC magnetic field, the smaller the value of Hr (45°), and as a result, the value of the ratio (Hr (45°)/Hr (0°)) can be decreased. The magnetic field strength of the AC magnetic field can be, for example, in a range of 150 Oe to 700 Oe. In addition, a frequency of the AC magnetic field can be, for example, 20 Hz to 200 Hz.

The magnetic recording medium according to one aspect of the present invention can be a tape-shaped magnetic recording medium (magnetic tape), and may be a disk-shaped magnetic recording medium (magnetic disk). For example, the magnetic tape is normally accommodated in a magnetic tape cartridge and the magnetic tape cartridge is mounted on a magnetic recording and reproducing device. A servo pattern can be formed on the magnetic recording medium by a well-known method, in order to perform head tracking in the magnetic recording and reproducing device. The "formation of the servo pattern" can be "recording of a servo signal". Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear-tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one embodiment, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID is unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, the group of a plurality of pairs of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes is shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a direct current magnet and an alternating current magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is perpendicular DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing is opposite to each other. Accordingly, the output of the servo signal obtained by the reading of the servo pattern can be increased. As disclosed in JP2012-53940A, in a case where the magnetic pattern is transferred to the magnetic tape subjected to the perpendicular DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is, for example, accommodated in a magnetic tape cartridge and the magnetic tape cartridge is mounted on a magnetic recording and reproducing device.

The magnetic recording medium can exhibit excellent electromagnetic conversion characteristics in a case of reproducing data recorded by the in-plane recording method, and thus is suitable as a magnetic recording medium for in-plane recording. However, it is not excluded that magnetic recording is performed on the magnetic recording medium by the perpendicular recording method.

Magnetic Tape Cartridge

One aspect of the present invention relates to a magnetic tape cartridge including the tape-shaped magnetic recording medium (that is, magnetic tape).

The details of the magnetic tape included in the magnetic tape cartridge are as described above.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data on the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer side of the magnetic tape, and accordingly, the recording and/or reproduction of data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. The magnetic tape cartridge may include the magnetic tape according to one aspect of the present invention, and well-known technologies can be applied for the other configurations. A total length of the magnetic tape accommodated in the magnetic tape cartridge can be, for example, 800 m or more, and can be in a range of approximately 800 m to 2,000 m. The longer the total length of the tape accommodated in the magnetic tape cartridge is, the preferable it is from a viewpoint of increasing the capacity of the magnetic tape cartridge.

Magnetic Recording and Reproducing Device

According to still another aspect of the present invention, there is provided a magnetic recording and reproducing device including the magnetic recording medium described above.

In the present invention and the present specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device, for example, can be a sliding type magnetic recording and reproducing device. The sliding type magnetic recording and reproducing device is a device in which the surface of the magnetic layer side and the magnetic head are in contact with each other and slide, in a case of performing recording of data on the magnetic recording medium and/or reproducing of the recorded data. For example, the magnetic recording and reproducing device can attachably and detachably include the magnetic tape cartridge.

The magnetic recording and reproducing device may include a magnetic head. The magnetic head can be a recording head capable of performing the recording of data on the magnetic tape, and can also be a reproducing head capable of performing the reproducing of data recorded on the magnetic tape. In addition, in one embodiment, the magnetic recording and reproducing device can include both of a recording head and a reproducing head as separate magnetic heads. In another aspect, the magnetic head included in the magnetic recording and reproducing device can also have a configuration of comprising both of an element for recording data (recording element) and an element for reproducing data (reproducing element) in one magnetic head.

The recording head can be a magnetic head for in-plane recording or a magnetic head for perpendicular recording. For the magnetic head for in-plane recording and the magnetic head for perpendicular recording, well-known technologies for these heads can be applied. The magnetic recording medium can exhibit excellent electromagnetic conversion characteristics in a case of reproducing data recorded by the in-plane recording method. Therefore, the recording head included in the magnetic recording and reproducing device is preferably the magnetic head for in-plane recording.

As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements. The element for recording data and the element for reproducing are collectively referred to as "elements for data".

In the magnetic recording and reproducing device, the recording of data on the magnetic recording medium and/or the reproducing of data recorded on the magnetic recording medium can be performed, for example, by bringing the surface of the magnetic layer of the magnetic recording medium into contact with the magnetic head and sliding. The magnetic recording and reproducing device may include the magnetic recording medium according to one aspect of the present invention, and well-known technologies can be applied for the other configurations.

For example, in a case of recording data and/or reproducing the recorded data, first, tracking using a servo signal is performed. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can also perform the recording and/or reproducing with respect to other data bands. In this case, the servo signal reading element is moved to a predetermined servo band by using the UDIM information described above, and the tracking with respect to the servo band may be started.

EXAMPLES

Hereinafter, the present invention will be described with reference to examples. However, the present invention is not limited to the embodiments shown in the examples. "Parts" and "%" in the following description mean "parts by mass" and "% by mass", unless otherwise noted. "eq" indicates equivalent and is a unit not convertible into SI unit. In addition, steps and evaluations described below are performed in an environment of an atmosphere temperature of 23° C.±1° C., unless otherwise noted.

Producing of ε-Iron Oxide Powders No. 1 to No. 6

44.0 g of ammonia aqueous solution having a concentration of 25% was added to a material obtained by dissolving iron (III) nitrate nonahydrate (added amount: "amount of Fe nitrate" in Table 1), gallium (III) nitrate octahydrate (added amount: "amount of Ga nitrate" in Table 1), or aluminum (III) nitrate nonahydrate (added amount: "amount of Al nitrate in Table 1), cobalt (II) nitrate hexahydrate (added amount: "amount of Co nitrate" in Table 1), titanium (IV) sulfate (added amount: "amount of Ti sulfate" in Table 1), and 16.7 g of polyvinylpyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 11 g of citric acid in 100 g of pure water was added to the obtained solution and stirred for 1 hour. The powder precipitated after the stirring was collected by centrifugal separation, washed with pure water, and dried in a heating furnace at a furnace inner temperature of 80° C.

8,900 g of pure water was added to the dried powder and the powder was dispersed in water again, to obtain a dispersion liquid. The obtained dispersion liquid was heated to a liquid temperature of 50° C., and 440 g of ammonia aqueous solution having a concentration of 25% was added dropwise while stirring. The stirring was performed for 1 hour while holding the temperature of 50° C., and 160 mL of tetraethoxysilane (TEOS) was added dropwise and stirred for 24 hours. 500 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature shown in Table 1 (in Table 1, "heat treatment temperature") was loaded with the obtained precursor of ferromagnetic powder in the atmosphere and subjected to heat treatment for 4 hours.

The powder after the heat treatment was put into a 4 mol/L aqueous solution of sodium hydroxide (NaOH) and stirred while maintaining the liquid temperature at 75° C. for 24 hours, and the coating film removing step was carried out.

After that, the ferromagnetic powder which is subjected to the coating film removal process was collected by centrifugal separation process, washed with pure water, and dried in a heating furnace at a furnace temperature of 95° C.

The composition of the ferromagnetic powder obtained after the drying described above was confirmed by Inductively Coupled Plasma-Optical Emission Spectrometry (ICP-OES), and it is confirmed that the composition is a substitution type ε-iron oxide powder containing the composition shown in Table 1. The values shown in Table 1 for the composition are values of respective elements (x, y, z, and (2-x-y-z)) in a composition formula: $A^1{}_x A^2{}_y A^3{}_z Fe_{(2-x-y-z)}O_3$. In addition, the ferromagnetic powder was scanned with a CuKα ray under the conditions of a voltage 45 kV and intensity of 40 mA, the X-ray diffraction pattern was measured under the following conditions (X-ray diffraction analysis), and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degree The average particle size of the ferromagnetic powder was obtained by the method described above using a transmission electron microscope H-9000 manufactured by Hitachi, Ltd. as the transmission electron microscope, and image analysis software KS-400 manufactured by Carl Zeiss as the image analysis software. The obtained average particle size is shown in Table 1.

Example 1

Magnetic Layer Forming Composition
Magnetic Liquid
ε-Iron Oxide Powder (see Table 1): 100.0 parts
A sulfonic acid group-containing polyurethane resin: 15.0 parts
Cyclohexanone: 150.0 parts
Methyl ethyl ketone: 150.0 parts
Abrasive Solution
α-alumina (Average particle size: 110 nm): 9.0 parts
Vinyl chloride copolymer (MR 110 manufactured by Kaneka Corporation): 0.7 parts
Cyclohexanone: 20.0 parts
Projection Formation Agent Liquid
Colloidal silica (average particle size: 100 nm): 1.3 parts
Methyl ethyl ketone: 9.0 parts
Cyclohexanone: 6.0 parts
Other Components
Butyl stearate: 1.0 part
Stearic acid: 1.0 part
Polyisocyanate (CORONATE manufactured by Tosoh Corporation): 2.5 parts
Finishing Additive Solvent
Cyclohexanone: 180.0 parts
Methyl ethyl ketone: 180.0 parts
Non-Magnetic Layer Forming Composition
Non-magnetic inorganic powder (α-iron oxide): 80.0 parts
(Average particle size: 0.15 μm, average acicular ratio: 7, Brunauer-Emmett-Teller (BET) specific surface area: 52 m²/g)
Carbon black (average particle size: 20 nm): 20.0 parts
Electron beam curable vinyl chloride copolymer: 13.0 parts
Electron beam curable polyurethane resin: 6.0 parts
Phenylphosphonic acid: 3.0 parts
Cyclohexanone: 140.0 parts
Methyl ethyl ketone: 170.0 parts
Butyl stearate: 4.0 parts
Stearic acid: 1.0 part
Back Coating Layer Forming Composition
Non-magnetic inorganic powder (α-iron oxide): 80.0 parts
(Average particle size: 0.15 μm, average acicular ratio: 7, BET specific surface area: 52 m²/g)
Carbon black (average particle size: 20 nm): 20.0 parts
Carbon black (average particle size: 100 nm): 3.0 parts
A vinyl chloride copolymer: 13.0 parts
A sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE manufactured by Tosoh Corporation): 5.0 parts
Methyl ethyl ketone: 400.0 parts
Preparation of Each Layer Forming Composition
The magnetic layer forming composition was prepared by the following method.

Various components of the magnetic liquid were dispersed to prepare a magnetic liquid. For the dispersion process, a batch type perpendicular sand mill was used, and zirconia beads were used as the dispersion beads.

After mixing various components of the abrasive solution described above, this was put into a perpendicular sand mill disperser together with zirconia beads having a bead diameter of 1 mm, a proportion of a bead volume with respect to a total of an abrasive solution volume and a bead volume was adjusted to 60%, and the sand mill dispersion process was performed for 180 minutes. The liquid after the sand mill dispersion process was taken out and subjected to the ultrasonic dispersion filtration treatment using a flow type ultrasonic dispersion filtering device to prepare an abrasive solution.

The magnetic liquid, the projection formation agent liquid, the abrasive solution, the other components, and the finishing additive solvent were introduced into a dissolver stirrer, and stirred at a circumferential speed of 10 m/sec for 30 minutes. Then, after performing the process 2 times of pass with a flow type ultrasonic disperser at a flow rate of 7.5 kg/min, the magnetic layer forming composition was prepared by filtering once with a filter having a hole diameter of 1.0 µm.

The non-magnetic layer forming composition was prepared by the following method.

The components excluding the lubricant (butyl stearate and stearic acid) were kneaded and diluted with an open kneader, and then dispersed with a transverse beads mill disperser. Then, the lubricant (butyl stearate and stearic acid) was added, and the mixture was stirred and mixed with a dissolver stirrer to prepare a non-magnetic layer forming composition.

The back coating layer forming composition was prepared by the following method.

The components excluding the lubricant (stearic acid), polyisocyanate, and methyl ethyl ketone (400.0 parts) were kneaded and diluted with an open kneader, and then dispersed with a transverse beads mill disperser. Then, the lubricant (stearic acid), polyisocyanate, and methyl ethyl ketone (400.0 parts) were added, and the mixture was stirred and mixed with a dissolver stirrer to prepare a back coating layer forming composition.

Manufacturing of Magnetic Tape

The non-magnetic layer forming composition was applied to a surface of a biaxial stretching support made of polyethylene naphthalate having a thickness of 5.0 µm so that the thickness after the drying is 1.0 µm and was dried to emit an electron beam to have energy of 40 kGy at an acceleration voltage of 125 kV thereby forming a non-magnetic layer.

The magnetic layer forming composition was applied onto the formed non-magnetic layer so that the thickness after the drying is 50 nm, and a coating layer was formed. A perpendicular orientation process was performed by applying a magnetic field having a magnetic field strength of 0.6 T in a perpendicular direction with respect to the surface of the coating layer using a permanent magnet in the orientation zone, while the coating layer is wet. Immediately after that, an AC magnetic field having a magnetic field strength shown in Table 1 and having a frequency of 50 Hz was applied in the longitudinal direction of the coating layer (specifically, direction that is the longitudinal direction in the finally formed magnetic tape) using an AC magnetic field application device, and then dried to form the magnetic layer.

After that, the back coating layer forming composition as described above was applied to the surface of the support opposite to the surface where the non-magnetic layer and the magnetic layer were formed, so that the thickness after the drying becomes 0.5 µm, and was dried to form a back coating layer.

Then, a surface smoothing process (calender process) was performed by using a calender roll configured of only a metal roll, at a calender process speed of 80 m/min, linear pressure of 300 kg/cm (294 kN/m), and a surface temperature of a calender roll of 110° C.

Then, the heat treatment was performed in the environment of the atmosphere temperature of 70° C. for 36 hours.

After heat treatment, the slitting was performed to have a width of ½ inches (0.0127 meters), the surface of the magnetic layer was cleaned with a tape cleaning device attached to a device including a device for sending and winding of a slit product so that a non-woven fabric and a razor blade were in contact with the surface of the magnetic layer, and a servo pattern having arrangement and a shape according to linear-tape-open (LTO) Ultrium format was formed on the magnetic layer by a servo write head mounted on a servo writer, in a state where the magnetic layer of the magnetic tape was demagnetized.

Accordingly, a magnetic tape including data bands, servo bands, and guide bands in the disposition according to the LTO Ultrium format in the magnetic layer, and including servo patterns having the disposition and the shape according to the LTO Ultrium format on the servo band was obtained.

Examples 2 to 9 and Comparative Examples 1 and 2

A magnetic tape was produced by the method described in Example 1, except that the items shown in Table 1 were changed as shown in Table 1.

In Comparative Example 1, since the AC magnetic field application process after the perpendicular orientation process was not performed, "-" was indicated in the column of the magnetic field strength of the AC magnetic field.

In the examples and the comparative examples, two magnetic tapes were produced, one was used for the evaluation of the signal-to-noise ratio (SNR), and the other one was used for the other evaluations.

Evaluation Method of Physical Properties

Ratio (Hr (45°)/Hr (0°))

A sample piece for the Hr (0°) measurement and a sample piece for the Hr (45°) measurement were cut out from each of the magnetic tapes of Examples and Comparative Examples. The Hr (0°) and the Hr (45°) were measured using the cut-out sample pieces by the method described above. The ratio (Hr (45°)/Hr (0°)) was calculated by dividing the Hr (45°) obtained by the measurement by Hr (0°).

Performance Evaluation Method

In-Plane Recording Suitability (SNR)

In an environment of an atmosphere temperature of 23° C.±1° C. and a relative humidity of 50%, a recording head (Metal-in-gap (MIG) head, gap length: 0.15 µm, 1.8 T) and a Giant Magnetorestive (MR) head for reproducing (reproducing track width: 1 µm) were attached to a loop tester, a signal having a linear recording density of 325 kfci was recorded by the in-plane recording method (as described above, the recording method for controlling the direction of the recording magnetic field applied to a recording layer for magnetization inversion to be parallel to the in-plane direction), and then, a reproducing signal was measured with a spectrum analyzer manufactured by Advantest Corporation. In addition, the unit kfci is a unit of linear recording density (cannot be converted to SI unit system). A ratio of the output value of the carrier signal to the integrated noise in the entire spectrum was defined as SNR. In order to measure the SNR, a sufficiently stabilized portion of the signal was used after the running of the magnetic tape was started. The SNR thus obtained is shown in Table 1 as a relative value with respect to the value of Comparative Example 1.

The result described above is shown in Table 1 (Tables 1-1 to 1-3).

TABLE 1-1

|  |  |  | Unit | Example 1 | Example 2 | Example 3 | Example 4 |
|---|---|---|---|---|---|---|---|
| ε-iron oxide powder | No. |  | — | 1 | 1 | 1 | 1 |
|  | Raw material | Amount of Fe nitrate | g | 92.2 | 92.2 | 92.2 | 92.2 |
|  |  | Amount of Ga nitrate | g | 14.4 | 14.4 | 14.4 | 14.4 |
|  |  | Amount of Al nitrate | g | 0.0 | 0.0 | 0.0 | 0.0 |
|  |  | Amount of Co nitrate | g | 2.1 | 2.1 | 2.1 | 2.1 |
|  |  | Amount of Ti sulfate | g | 1.7 | 1.7 | 1.7 | 1.7 |
|  | Composition |  | Fe:Ga or Al:Co:Ti | 1.62:0.28:0.05:0.05 | 1.62:0.28:0.05:0.05 | 1.62:0.28:0.05:0.05 | 1.62:0.28:0.05:0.05 |
|  | Heat treatment temperature |  | °C. | 1000 | 1000 | 1000 | 1000 |
|  | Average particle size |  | nm | 11.8 | 11.8 | 11.8 | 11.8 |
| AC magnetic field | Magnetic field strength |  | Oe | 300 | 450 | 650 | 180 |
| Physical properties | Hr (0°) |  | Oe | 11550 | 11550 | 11550 | 11550 |
|  | Hr (45°) |  | Oe | 4890 | 3760 | 3510 | 5730 |
|  | Hr (45°)/Hr (0°) |  | — | 0.42 | 0.33 | 0.30 | 0.50 |
| Performance | Comparative Example 1 SNR |  | dB | 1.7 | 2.0 | 2.2 | 1.0 |

TABLE 1-2

|  |  |  | Unit | Example 5 | Example 6 | Example 7 | Example 8 | Example 9 |
|---|---|---|---|---|---|---|---|---|
| ε-iron oxide powder | No. |  | — | 2 | 3 | 4 | 5 | 6 |
|  | Raw material | Amount of Fe nitrate | g | 92.2 | 92.2 | 93.9 | 89.9 | 92.8 |
|  |  | Amount of Ga nitrate | g | 14.4 | 14.4 | 11.8 | 21.9 | 0.0 |
|  |  | Amount of Al nitrate | g | 0.0 | 0.0 | 0.0 | 0.0 | 13.0 |
|  |  | Amount of Co nitrate | g | 2.1 | 2.1 | 2.5 | 1.3 | 2.1 |
|  |  | Amount of Ti sulfate | g | 1.7 | 1.7 | 2.0 | 1.0 | 1.7 |
|  | Composition |  | Fe:Ga or Al:Co:Ti | 1.62:0.28:0.05:0.05 | 1.62:0.28:0.05:0.05 | 1.65:0.23:0.06:0.06 | 1.59:0.35:0.03:0.03 | 1.63:0.27:0.05:0.05 |
|  | Heat treatment temperature |  | °C. | 980 | 1020 | 1000 | 1000 | 1000 |
|  | Average particle size |  | nm | 10.0 | 14.5 | 11.6 | 11.8 | 11.7 |
| AC magnetic field | Magnetic field strength |  | Oe | 300 | 300 | 300 | 300 | 300 |
| Physical properties | Hr (0°) |  | Oe | 10200 | 13830 | 10790 | 12140 | 11100 |
|  | Hr (45°) |  | Oe | 4280 | 6580 | 4660 | 5690 | 4840 |
|  | Hr (45°)/Hr (0°) |  | — | 0.42 | 0.48 | 0.43 | 0.47 | 0.44 |
| Performance | Comparative Example 1 SNR |  | dB | 1.7 | 1.5 | 1.7 | 1.5 | 1.7 |

TABLE 1-3

|  |  | Unit | Comparative Example 1 | Comparative Example 2 |
|---|---|---|---|---|
| ε-iron oxide powder |  No. | — | 1 | 1 |
|  | Raw material Amount of Fe nitrate | g | 92.2 | 92.2 |
|  | Amount of Ga nitrate | g | 14.4 | 14.4 |
|  | Amount of Al nitrate | g | 0.0 | 0.0 |
|  | Amount of Co nitrate | g | 2.1 | 2.1 |
|  | Amount of Ti sulfate | g | 1.7 | 1.7 |
|  | Composition | Fe:Ga:Co:Ti | 1.62:0.28:0.05:0.05 | 1.62:0.28:0.05:0.05 |
|  | Heat treatment temperature | ° C. | 1000 | 1000 |
|  | Average particle size | nm | 11.8 | 11.8 |
| AC magnetic field | Magnetic field strength | Oe | — | 120 |
| Physical | Hr (0°) | Oe | 11550 | 11550 |
| properties | Hr (45°) | Oe | 6290 | 6050 |
|  | Hr (45°)/Hr (0°) | — | 0.54 | 0.52 |
| Performance | Comparative Example 1 SNR | dB | 0.0 | 0.5 |

From the results shown in Table 1, it can be confirmed that the magnetic tape of each example is the magnetic tape having the magnetic layer containing the ε-iron oxide powder, and having excellent electromagnetic conversion characteristics (high SNR) in a case of reproducing the data recorded by the in-plane recording method.

One aspect of the present invention is effective for data storage.

What is claimed is:

1. A perpendicular-orientated magnetic recording medium comprising:
    a non-magnetic support; and
    a magnetic layer containing a ferromagnetic powder,
    wherein the ferromagnetic powder is an ε-iron oxide powder,
    a ratio of Hr (45°) to Hr (0°), Hr (45°)/Hr (0°), is 0.50 or less,
    the Hr (0°) is a residual coercive force Hr obtained by applying a pulse magnetic field having a pulse width of 0.76 ms in an in-plane direction of the magnetic recording medium, and
    the Hr (45°) is a residual coercive force Hr obtained by setting an angle of the magnetic recording medium in the in-plane direction to 0°, setting an angle of the magnetic recording medium in a perpendicular direction to 90°, and making a pulse magnetic field having a pulse width of 0.76 ms be incident from a direction inclined by 45° toward the perpendicular direction from the in-plane direction and applying the pulse magnetic field to the magnetic recording medium.

2. The perpendicular-orientated magnetic recording medium according to claim 1,
    wherein the ratio, Hr (45°)/Hr (0°), is 0.45 or less.

3. The perpendicular-orientated magnetic recording medium according to claim 1,
    wherein the ratio, Hr (45°)/Hr (0°), is 0.40 or less.

4. The perpendicular-orientated magnetic recording medium according to claim 1,
    wherein the ratio, Hr (45°)/Hr (0°), is 0.35 or less.

5. The perpendicular-orientated magnetic recording medium according to claim 1,
    wherein the ratio, Hr (45°)/Hr (0°), is 0.10 to 0.35.

6. The perpendicular-orientated magnetic recording medium according to claim 1,
    wherein the ε-iron oxide powder contains a cobalt element, an element selected from the group consisting of a gallium element and an aluminum element, and a titanium element.

7. The perpendicular-orientated magnetic recording medium according to claim 1, further comprising:
    a non-magnetic layer containing a non-magnetic powder between the non-magnetic support and the magnetic layer.

8. The perpendicular-orientated magnetic recording medium according to claim 1, further comprising:
    a back coating layer containing a non-magnetic powder on a surface side of the non-magnetic support opposite to a surface side provided with the magnetic layer.

9. The perpendicular-orientated magnetic recording medium according to claim 1,
    wherein the magnetic recording medium is a magnetic tape.

10. A magnetic tape cartridge comprising:
    the magnetic tape according to claim 9.

11. The magnetic tape cartridge according to claim 10,
    wherein the ratio, Hr (45°)/Hr (0°), is 0.45 or less.

12. The magnetic tape cartridge according to claim 10,
    wherein the ratio, Hr (45°)/Hr (0°), is 0.40 or less.

13. The magnetic tape cartridge according to claim 10,
    wherein the ratio, Hr (45°)/Hr (0°), is 0.35 or less.

14. The magnetic tape cartridge according to claim 10,
    wherein the ratio, Hr (45°)/Hr (00), is 0.10 to 0.35.

15. A magnetic recording and reproducing device comprising:
    the perpendicular-orientated magnetic recording medium according to claim 1.

16. The magnetic recording and reproducing device according to claim 15,
    wherein the ratio, Hr (45°)/Hr (0°), is 0.45 or less.

17. The magnetic recording and reproducing device according to claim 15,
    wherein the ratio, Hr (45°)/Hr (0°), is 0.40 or less.

18. The magnetic recording and reproducing device according to claim 15,
    wherein the ratio, Hr (45°)/Hr (0°), is 0.35 or less.

19. The magnetic recording and reproducing device according to claim 15,
    wherein the ratio, Hr (45°)/Hr (00), is 0.10 to 0.35.

* * * * *